(12) United States Patent
McDougal et al.

(10) Patent No.: US 8,875,293 B2
(45) Date of Patent: Oct. 28, 2014

(54) SYSTEM, METHOD, AND LOGIC FOR CLASSIFYING COMMUNICATIONS

(75) Inventors: Monty D. McDougal, St. Paul, TX (US); William E. Sterns, Dallas, TX (US); Randy S. Jennings, Plano, TX (US)

(73) Assignee: Raytheon Company, Waltham, MA (US)

( * ) Notice: Subject to any disclaimer, the term of this patent is extended or adjusted under 35 U.S.C. 154(b) by 72 days.

(21) Appl. No.: 13/240,567

(22) Filed: Sep. 22, 2011

(65) Prior Publication Data

US 2013/0081142 A1    Mar. 28, 2013

(51) Int. Cl.
*H04L 29/06* (2006.01)
*G06F 21/56* (2013.01)
*G06F 21/55* (2013.01)

(52) U.S. Cl.
CPC .............. *G06F 21/554* (2013.01); *G06F 21/56* (2013.01)
USPC .................. 726/24; 726/22; 726/23; 713/188

(58) Field of Classification Search
USPC ................................. 726/22, 23, 24; 713/188
See application file for complete search history.

(56) References Cited

U.S. PATENT DOCUMENTS

| | | | |
|---|---|---|---|
| 7,809,824 B2 | 10/2010 | Wei et al. | |
| 8,230,510 B1 * | 7/2012 | Yang et al. | 726/24 |
| 8,307,099 B1 * | 11/2012 | Khanna et al. | 709/229 |
| 2003/0191969 A1 | 10/2003 | Katsikas | |
| 2005/0125402 A1 * | 6/2005 | Viola et al. | 707/6 |
| 2005/0183143 A1 | 8/2005 | Anderholm et al. | |
| 2005/0203881 A1 | 9/2005 | Sakamoto et al. | |
| 2007/0094734 A1 * | 4/2007 | Mangione-Smith et al. | 726/24 |
| 2007/0240222 A1 * | 10/2007 | Tuvell et al. | 726/24 |
| 2008/0126951 A1 | 5/2008 | Sood et al. | |
| 2010/0162395 A1 * | 6/2010 | Kennedy | 726/23 |
| 2011/0041179 A1 * | 2/2011 | St Hlberg | 726/23 |
| 2011/0047620 A1 * | 2/2011 | Mahaffey et al. | 726/23 |
| 2011/0083180 A1 * | 4/2011 | Mashevsky et al. | 726/23 |
| 2011/0283356 A1 * | 11/2011 | Fly et al. | 726/22 |
| 2012/0017275 A1 * | 1/2012 | Harmonen | 726/24 |
| 2012/0017281 A1 * | 1/2012 | Banerjee et al. | 726/25 |
| 2012/0102568 A1 * | 4/2012 | Tarbotton et al. | 726/23 |
| 2012/0159620 A1 * | 6/2012 | Seifert et al. | 726/22 |
| 2012/0254085 A1 * | 10/2012 | Maruyama et al. | 706/20 |
| 2012/0278342 A1 * | 11/2012 | Purdy | 707/749 |
| 2013/0055338 A1 * | 2/2013 | McDougal et al. | 726/1 |
| 2013/0074185 A1 * | 3/2013 | McDougal et al. | 726/24 |
| 2013/0144860 A1 * | 6/2013 | Xu et al. | 707/709 |
| 2013/0291111 A1 * | 10/2013 | Zhou et al. | 726/23 |

* cited by examiner

*Primary Examiner* — Christopher Revak
*Assistant Examiner* — Sarah Su
(74) *Attorney, Agent, or Firm* — Schwegman Lundberg & Woessner, P.A.

(57) ABSTRACT

In accordance with particular embodiments, a method includes intercepting a communication and extracting metadata associated with the communication. The extracted metadata comprises a plurality of different fields from communication metadata and file metadata. The method further includes determining a score, based on previous communications, for each field of the extracted metadata. The score is indicative of a likelihood that the communication is a malicious communication. The method additionally includes combining the scores to generate a combined score for the communication based on an algorithm developed from the previous communications. The method also includes generating, based on the combined score at a first time, a predicted classification as to whether the communication is a malicious communication. The method further includes receiving, at a second time subsequent to the first time, an indication of whether the communication is a malicious communication and updating the algorithm based on the indication.

24 Claims, 4 Drawing Sheets

SYSTEM, METHOD, AND LOGIC FOR CLASSIFYING COMMUNICATIONS

BACKGROUND

Malicious communications are coming from an increasing number of sources using ever changing techniques. These malicious communications present problems in terms of security breaches, such as providing access to internal documents, and resource consumption, such as flooding a network with useless traffic. One way in which these malicious communications get past a company's or user's security measures is by hiding the malicious code in attachments to the communication. Typical security measures simply look at the file extension of any attachment to determine whether or not to block communication. This allows the sender to circumvent these security measures by giving their malicious code a safe extension, or by hiding it within a different file type.

SUMMARY

According to one embodiment, a computer-implemented method for execution on one or more processors includes intercepting a communication at a first node of a security system. The method also includes extracting communication metadata associated with the communication. The communication metadata comprises a plurality of different fields. The method additionally includes determining if the communication comprises an attached file and, if so, extracting file metadata associated with the file. The file metadata comprises a second plurality of different fields. The method further includes determining a score for each field of extracted metadata comprising the file metadata and the communication metadata. The score for each filed of extracted metadata is indicative of a likelihood that the communication is a malicious communication and is determined based on previous communications. The method additionally includes combining the scores for the plurality of fields to generate a combined score for the communication. The combined score is based on an algorithm developed from previous communications. The method also includes generating, at a first time based on the combined score, a predicted classification providing a prediction as to whether the communication is a malicious communication. The method further includes receiving, at a second time subsequent to the first time, an indication of whether the communication is a malicious communication. The method additionally includes updating the algorithm based on the indication of whether the communication is a malicious communication.

Depending on the specific features implemented, particular embodiments may exhibit some, none, or all of the following technical advantages. For example particular embodiments may classify intercepted communications based on their extracted metadata, including communication metadata and/or file metadata (if a file is attached to the communication). The algorithm used to make the classification may be updated based on the success or failure of previous classifications. Accordingly, the classification algorithm may update itself. In certain embodiments, metadata fields not previously thought to be relevant may be discovered to be of value in classifying intercepted communications. Accordingly, more accurate classifications may be made.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION OF EXAMPLE EMBODIMENTS

Figure 1:
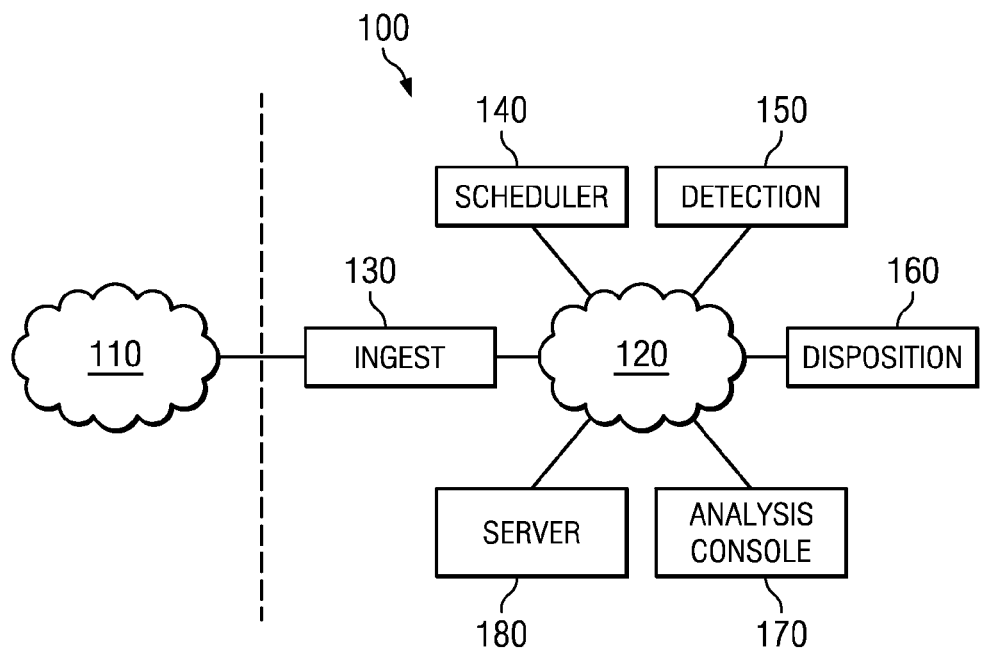
FIG. 1 is a block diagram illustrating one embodiment of a system that is operable to classify communications.

FIG. 1 is a block diagram illustrating one embodiment of system 100 that is operable to classify communications. The block diagram includes external network 110 and internal network 120. Internal network 120 couples ingest block 130, scheduler block 140, detection block 150, disposition block 160, analysis console block 170 and server block 180. Although this particular implementation of system 100 is depicted and primarily described, the present disclosure contemplates any suitable implementation of system 100, according to particular embodiments.

Blocks 130-180 may be configured to classify communications (e.g., malicious or not malicious) dynamically using metadata associated with the communications. The metadata, as used herein, includes communication metadata from the communication itself (e.g., from the header, hidden fields, etc.) and any file metadata from any files attached to the communication (e.g., author, program, etc.). In certain embodiments, the metadata for a communication is scored and then processed to generate a prediction as to how the communication should be classified. The communication may then be processed based on the prediction. At some point after making the prediction, the system may receive an indication of whether or not the prediction was correct. For example, the system may classify a communication as a suspected malicious communication, the communication may then be analyzed by, for example, a user who is able to determine if the communication is malicious. The user's determination may then be communicated to the system. This feedback may then be used to adjust how metadata is used to score and/or process future communications. The metadata fields used, and how they are scored, to classify intercepted communications may dynamically change over time as indications are received regarding previous classifications. This may result in discovering new metadata fields and/or field values indicative of the classification of communications. These discovered fields or values may be fields or values not readily recognizable without the aid of certain embodiments disclosed herein. For example, a PDF rendering agent may over time become an indicator of how to classify a communication. In some instances, the presence or absence of certain metadata fields, or field values, may be an indicator of how to classify the communication. In particular embodiments, the classification may be based on Bayesian analysis. For example, each metadata field may be scored using a binary scoring system in which a field is or is not likely to be indicative of a particular classification.

Blocks 130-180 may communicate with each other using internal network 120. In various embodiments, communication between blocks 130-180 utilizing internal network 120 may be indirect. For example, one or more of blocks 130-180 may be in a demilitarized zone (DMZ) that may limit direct communication between blocks 130-180. In various embodiments, blocks 130-180 may represent hardware, encoded software or a combination of the two. Blocks 130-180 may be implemented on the same or different hardware in various suitable combinations. Further details regarding the implementation and/or operation of blocks 130-180 may be determined by referencing FIGS. 2-6 and their accompanying descriptions below.

Networks 110 and 120 may be communicative platforms operable to exchange data or information. In various embodiments, the networks may include packet data networks offering communication interfaces or exchanges between any two nodes in system 100. Networks 110 and 120 may each be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In various embodiments, networks 110 and 120 may each include firewalls or other equipment or encoded software that create security zones and/or secure networks such as DMZs. One or more of blocks 130-180 may be located in one or more of such security zones and/or secure networks in some embodiments. For example, analysis console 170 may be in a DMZ that is separate from ingest block 130 and detection block 150. As another example, ingest block 130 may be in a different security zone than detection block 150.

For purposes of this disclosure, a communication may include one or more of the following in any suitable combination: (1) an email message; (2) an instant message; (3) a text message; (4) a chat message; (5) a website; (6) any attachment or file associated with any of the messages or websites from above; or (7) any other suitable target object for which classification may be appropriate.

In operation, in various embodiments, ingest block 130 may receive a communication from network 110. For example, an email may be received by ingest block 130. Ingest block 130 may extract metadata from the communication. The extracted metadata may include metadata from a file attached to the communication, the header of the communication, hidden fields within or associated with the communication and/or file, or any other information that may be associated with the communication. Ingest block 130 may analyze and score the extracted metadata. The scores for the metadata may be combined by ingest block 130 to generate a combined score. The combined score may be used to classify the communication. The classification may be used in determining how the communication is processed. For example, the communication may be allowed to continue on to the recipient or it may be sent to another block for further processing (e.g., by a human analyst). In some embodiments, detection block 150 may perform additional tests based on the classification determined by ingest block 130 in accordance with scheduling performed by scheduler block 140. For example, if ingest block 130 classifies a message as potentially containing mal-ware, detection block 150 may determine whether the communication contains mal-ware and whether the mal-ware can be neutralized or removed, or whether a human analyst is needed to further classify the communication. Disposition block 160 may utilize the results of the tests performed by detection block 150 to determine what should be done with the communication. In some cases, disposition block 160 will send the communication to analysis console 170 for further review by a human analyst.

In certain instances, after ingest block 130 has classified a communication, it may receive, from another block or from a user (e.g., a human analyst and/or a system administrator), an indication as to whether ingest block 130 correctly classified the communication. In some embodiments, the initial classification made by ingest block 130 may be considered a prediction with the subsequent indication being an actual classification. For example, ingest block 130 may predict that a communication is malicious. Based on the prediction, the communication may be quarantined. If an analyst deletes the communication, removes some malicious code, or otherwise confirms that the communication was malicious, ingest block 130 may update its algorithm and/or scoring to reflect a successful classification. If the analyst indicates that the communication is not malicious, ingest block 130 may update its algorithm and/or scoring to reflect a miss-classification. As another example, ingest bock 130 may predict that a communication comprise malicious code. Based on the prediction, the communication may be sent to another block of system 100 for further processing. If the communication is found to contain malicious code (e.g., in an attachment to the communication or embedded within a message of the communication, such as in the header or other metadata), ingest block 130 may update its algorithm and/or scoring to reflect a successful classification, and if the communication is found to not contain malicious code, ingest block 130 may update its algorithm and/or scoring to reflect a miss-classification.

In various embodiments, disposition block 160 may respond to the results of detection block 150 regardless of whether it sends the file to analysis console 170. For example, disposition block 160 may determine that the communication should be quarantined and may send the file to server block 180 to quarantine the file. In some embodiments, disposition block 160 may also determine that the communication is not malicious and may perform suitable corresponding actions with nodes coupled to external network 110. For example, disposition block 160 may cause the delivery of the communication to the intended recipient in response to the determination by disposition block 160 that the communication did not contain malicious code. As another example, disposition block 160 may cause the communication to be delivered to a quarantine folder or to a specialized user responsible to for assessing whether a communication contains malicious code.

Some or all of system 100, in various embodiments, may be utilized to classify communications. In some embodiments, system 100 may be used in a messaging environment, such as, but not limited to, an email environment, an instant messaging environment, a peer-to-peer messaging environment, a chat environment, or other messaging environments. Aspects of system 100 may also be used in a Web browsing context. In such a context, some or all of system 100 may analyze requested Web pages (e.g., page content, address, URL, etc.) and determine if they contain any malicious files or code. System 100 may be used to detect malicious files in these and other contexts utilizing suitable configurations of ingest block 130. For example, if the context is an email context, then ingest block 130 may be configured as a Mail Transfer Agent (MTA) that is able to handle email messages. Configured in this manner, ingest block 130 may, for a communication, analyze the metadata, the message, an attachment, or a combination of the preceding. When aspects of system 100 are used in a Web browsing context, ingest block 130 may be configured to retrieve an address associated with an Internet site and analyze the address, the content of the respective site, or any other features, aspects, or data that may be associated with the address or website. In some embodiments, anomalies in the URL may be used in classifying communications (e.g., the URL may be tokenized).

In particular embodiments, ingest block 130 may be configured to create and update the algorithm(s) and scoring used to classify communications. The scoring may be based on a collection, such as a database, of previous metadata fields and field values. For example, for a particular sender the database or collection of information may identify whether the sender is likely to send malicious or non-malicious communications. The score derived from the database or collection of information may change over time based on the success or failure of previous classifications. For example, a sender may initially be identified as not likely to send malicious emails. However, if the next five emails from the sender are all classified as malicious, then the database or collection of information may be updated to associate the sender as someone likely to send malicious emails.

In certain embodiments, the algorithm that combines the scores associated with a communication may, in essence, apply varying weights to various metadata fields. As with the information used to score a particular metadata value, the weighting or algorithm may dynamically change based on the success or failure of previous classifications.

In some embodiments, the system may be able to identify certain metadata fields or field values, either in the communication (e.g., in the header) or in an attached file or document, as being relevant. The identified metadata fields or field values may be identified despite not previously being relevant. In some embodiments, the system may provide a human analyst, system operator/administrator, and/or system manager with information regarding the identified metadata fields or field values. This may provide the analyst with new insights into the classification of communications.

In some embodiments, some or all of system 100 may be provided as a service to various agents. For example, an agent analyzing traffic passing through a particular boundary of a network may transmit certain traffic (such as one or more files) to aspects of system 100 for analysis and these or other aspects of system 100 may report to the agent the results of the analysis. As another example, an agent residing on a workstation or laptop computer used by end users may similarly transmit one or more files to some or all of system 100 for analysis and receive the results of the analysis. A particular example of such an agent is a client-located module capable of analyzing the downloaded contents of web-based email (e.g., GMAIL by GOOGLE; HOTMAIL by WINDOWS, or any other suitable web-based email program). As another example, a collaborative environment such as one associated with a cross-domain document management system (e.g., RAYTHEON's CHAIN environment) may utilize this service to help identify incoming communications that may contain malicious code. In some embodiments, aspects of system 100 may be offered as a service using Web service technology, such as JavaScript-based Application Programming Interfaces (APIs), Simple Object Access Protocol (SOAP) Remote Procedure Calls (RPCs), and/or other suitable network based APIs.

System 100, in various embodiments, may be configured to operate in one or more of an active mode, a passive mode, and a hybrid mode. Each of these example modes is described below in greater detail.

When operating in an active mode, system 100 may delay one or more operations while the classification process is proceeding, depending on the context in which system 100 is operating. For example, as discussed above, system 100 may operate in a messaging context such as analyzing email messages. If in the active mode, system 100 may prevent the delivery of an email until it has been classified using one or more of blocks 140-180. In some instances, the communication may be sent based on its classification. As another example, when system 100 is operating in an active mode in a context where communications are being uploaded (e.g., via a browser), system 100 may stop a communication from being completed until the communication has been classified. Hence, in some embodiments, if the communication was being written to a database, the communication would not be entered into the database and made available to other users or processes until the communication has been classified by the system 100. Depending on the classification, the communication may be forwarded to the originally intended recipient, quarantined for further analysis by, for example a human analyst or another component of system 100, forwarded to a particular folder or mail box (e.g., a folder configured to hold communications suspected of containing malicious code), or sent to another component of system 100 for additional analysis. If system 100 operates in a Web browsing context and is operating in the active mode, an Internet site or communication from an Internet site may not be transmitted to a Web browser requesting the site until the Internet site and/or communication has been classified. In some embodiments, ingest block 130 may be used to prevent the completion of operations until the communication has been classified.

System 100, in various embodiments, may operate in a passive mode. While in the passive mode, system 100 may not prevent the operation of processes while a communication is being classified. For example, when system 100 is handling emails with attachments and operating in the passive mode, the emails may continue to be processed and delivered even though the classification has not been completed. The communication may then be moved, if appropriate, once the classification has completed.

System 100, in various embodiments, may operate in a hybrid mode, which may comprise an ability to incorporate aspects of both the passive and active modes. In one example hybrid mode, system 100 may normally operate in an active mode, but if a queue of incoming communications becomes too large, system 100 may switch to a passive mode to prevent delay (e.g., a delay exceeding a threshold amount of time) in delivering the communications. As another example, when in the hybrid mode, system 100 may allow emails to be processed and delivered during the classification process; however, when an email is classified as containing malicious code, system 100 may allow the email to proceed in a passive manner but may prevent the malicious code from being delivered in an active manner. In some instances, the email may be edited by system 100 with a note to the recipient indicating that an attachment to the email is being analyzed and will be sent to the recipient once it has been found to be free of malicious code.

Figure 2:
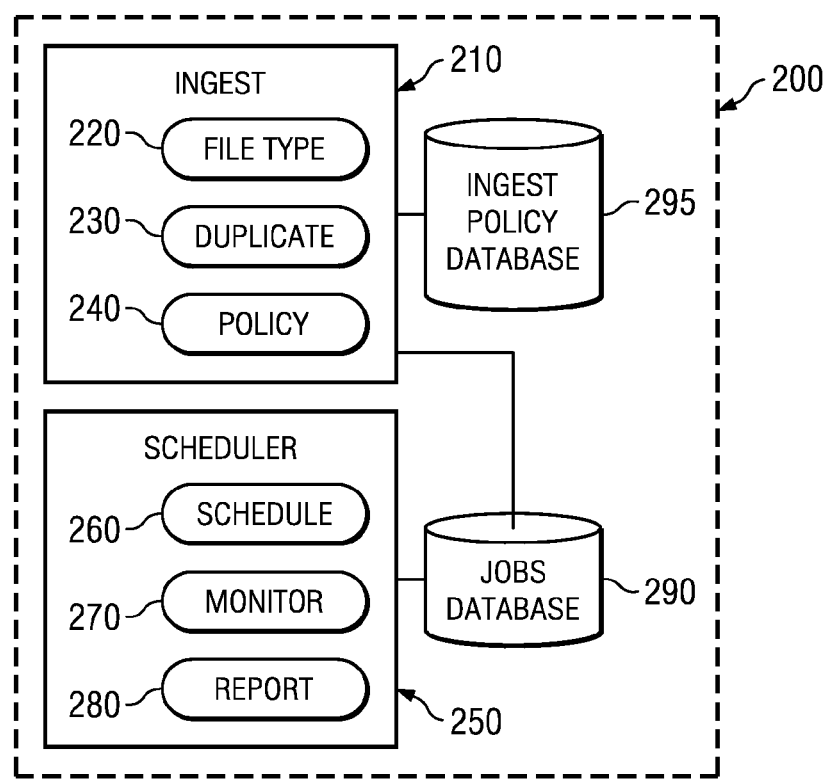
FIG. 2 illustrates one embodiment of a control module.

FIG. 2 illustrates one embodiment of control module 200. Control module 200 includes ingest module 210 and scheduler module 250. Ingest module 210 includes file type module 220, duplicate module 230, and policy module 240. Scheduler module 250 includes schedule module 260, monitor module 270, and report module 280. Ingest module 210 is coupled to jobs database 290 and ingest policy database 295. Scheduler module 250 is also coupled to jobs database 290. Using ingest module 210 and scheduler module 250, control module 200 may receive a communication and schedule the file for one or more processing schemes, including classification.

File type module 220 may be implemented using encoded software and/or hardware and may reside on the same hardware that ingest module 210 resides upon or on different hardware. File type module 220, in some embodiments, may be configured to determine the type of file that ingest module 210 receives (e.g., whether it is a communication or a different type of file). File type module 220 may, in certain embodiments, also be configured to determine the metadata for a communication. File type module 220 may determine the type of a file using any suitable methods in combination or separately. For example, file type module 220 may examine an extension associated with the file to determine the type of the file. As another example, file type module 220 may examine portions of the file in order to determine its type. File type module 220 may look at where it received the file to determine its type. File type module 220 may look at characters in a header of a file to determine its type. Such characters may be referred to as magic numbers or magic bits. In this manner, in some embodiments, file type module 220 may detect the correct type of the file even if the file's extension has been removed or changed. As another example, certain types of files (e.g., MICROSOFT OFFICE files) may be determined based on both magic number(s) and the file extension, possibly examining the magic number(s) prior to examining the file extension. File type module 220 may parse out and store each field value for each metadata field.

In various embodiments, duplicate module 230 may be implemented using encoded software and/or hardware and may reside on the same hardware as ingest module 210 or on different hardware. Duplicate module 230 may be configured to use one or more techniques to determine whether a file or communication has been previously processed. For example, duplicate module 230 may generate one or more hashes of the file (such as a checksum, an MD5 hash, and/or a SHA1 hash). These value(s) may be compared to a database containing hash values of previously analyzed files. If the hash value is in the database, duplicate module 230 may determine that the file has been previously analyzed. If the hash value is not present in the database duplicate module 230 may determine that the file has not been previously analyzed. In some embodiments, duplicate module 230 may use the name of the file and/or its extension, as well as variations on those items, to determine if the file has been previously analyzed. Depending on the embodiment and/or scenario, duplicate module 230 may assess whether the file has been previously analyzed.

If it is determined that a file has been analyzed previously, the results of the previous analysis of the file may be determined using a database that contains results of the previous analysis of the file. If the results indicate that the file is a communication and that the communication was classified in a particular fashion, then the analysis of the current file may end in a classification consistent with the previous classification. In some embodiments, this may allow for more efficient utilization of the resources used to classify communications.

Policy module 240, in various embodiments, may be implemented using encoded software, hardware or a combination of the two. Policy module 240 may reside on the same hardware as ingest module 210 or it may reside on separate hardware. In some embodiments, policy module 240 may be used to determine whether a file received by ingest module 210 is a communication and/or how it should be classified. Policy module 240 may be configured to access ingest policy database 295 to make such determinations, in various embodiments. For example, policy module 240 may determine that a file received by ingest module 210 is a communication. Policy module 240 may then access ingest policy database 295 and retrieve one or more policies associated with classifying a communication. A retrieved policy may specify how to score one or more field values for one or more metadata fields. Another retrieved policy may specify one or more algorithms to use to classify a communication using the determined scoring for the field values and/or metadata fields. Another retrieved policy may specify how the scoring or the algorithm is updated based on receiving indications as to how previous communications were actually classified.

Schedule module 260, in various embodiments, may be implemented using encoded software, hardware or a combination of the two. Schedule module 260 may reside on the same hardware as scheduler module 250 or it may reside on separate hardware. Schedule module 260, in some embodiments, may determine the order in which any jobs in jobs database 290 are performed. Schedule module 260 may maintain a list of detection nodes that can receive the jobs and may assign the jobs using any suitable method. For example, schedule module 260 may use a first-in-first-out (FIFO) algorithm to assign jobs to detection nodes. Jobs may also be prioritized. For example, schedule module may use a FIFO approach to schedule jobs initially, but it may be determined to prioritize one job over another (e.g., in response to results provided by the detection nodes). Schedule policies may be used by schedule module 260 to determine how to schedule jobs and how to prioritize jobs. Priorities for jobs, in some embodiments, may also be determined based on the context associated with the job. For example, if the job involves a communication with an attachment, it may be prioritized higher than other communications.

In some embodiments, when adding a new classification scheme or policy, policies used by schedule module 260 may need to be modified. The interface may require information to be entered regarding how the classification scheme should be applied. Such information may be entered using a tabbed interface, a wizard-style interface, or other interfaces for entering information. The information required to be entered may include how jobs should be prioritized based on responses from detection nodes, the context associated with the file or communication, what detection nodes are involved in implementing the classification for the classification scheme, and/or other items associated with applying the classification scheme.

Monitor module 270, in various embodiments, may be implemented using any suitable combination of encoded software and hardware. Monitor module 270 may reside on the same hardware as scheduler module 250 or it may reside on separate hardware. Monitor module 270 may be able to monitor the capacity of detection nodes that apply various classification schemes to a file or communication. In some embodiments, monitor module 270 may query the detection nodes to determine their status. Example status responses may include "offline" and/or "busy." In some embodiments, monitor module 270 may determine if a detection node has taken too long to analyze a file. Monitor module 270 may be able to reboot or restore aspects of the detection nodes. In various embodiments, monitor module 270 may be able to reconfigure a detection node so that the detection node may perform a different type of analysis. This reconfiguration may be performed in response to the types of files that are scheduled to be analyzed. In some embodiments, this reconfiguration capability may provide an advantage in that detection nodes may be utilized efficiently and files or communications may be classified faster.

Monitor module 270 may also be able to determine when the capacity of the detection nodes reaches a critical threshold. Schedule module 260 and/or monitor module 270 may ensure that detection nodes do not pass critical thresholds.

Monitor module 270 may also be able to determine when the load on the detection nodes decreases below a critical threshold. Monitor module 270 may also be able to establish various thresholds regarding the capacity of detection nodes and may be able to determine when the load of the various detection nodes has gone below any of the thresholds. For example, the ability to monitor thresholds and take appropriate action in response to the monitoring may be particularly useful in determining when to switch between one or more modes of operation, such as the active, passive, and hybrid modes. As a particular example, if a particular detection node is determined to be too busy (e.g., exceeds a capacity threshold) and that particular detection node is in active mode, it may be appropriate to switch the particular detection node to passive mode to avoid significant processing delays.

Databases 290 and 295 may be implemented using a variety of database structures. The databases may be row-oriented or column-oriented. They may include relational databases and/or object-oriented databases. Databases 290 and 295 may be indexed and accessed in a variety of manners, including by utilizing an operating system or through one or more networks. In some embodiments, databases 290 and 295 may be implemented in one database such that separate tables within the database may be used to store the information contained in databases 290 and 295.

In some embodiments, jobs database 290 stores jobs related to classifying communications. A job stored in the database may include information such as an identifier associated with the communication, information regarding what test(s) should be applied to classify the communication, and the priority associated with the job. Jobs database 290 may be configured so that it can be accessed by ingest module 210 and scheduler module 250. Ingest module 210 may insert jobs into the job database and scheduler module 250 may read the jobs database to determine which jobs need to be assigned to detection nodes.

In some embodiments, ingest policy database 295 may contain a set of policies that determine how a communication is to be classified. Some of the policies of policy database 295 may include metadata detection schemes configured to extract multiple different field values from the corresponding metadata fields of the communication and/or the attached file. Some of the policies of policy database 295 may include scoring schemes configured to score one or more of the extracted field values based on the likelihood that the field value is, or is not, likely to be associated with a communication of a particular classification. In some embodiments, the scoring may be binary. For example, if the system is determining whether to classify a communication as malicious, a field value may be scored a "1" if the field value is indicative of a malicious communication and it may be scored a "0" if the field value is not indicative of a malicious communication. Policy database 295 may contain a set of policies that determines how the scores for a communication are combined to classify the communication. For example, in certain embodiments, policy database 295 may contain policies for associating different weights to the different metadata fields and/or to different field values. Policy database 295 may contain policies for updating how a field value or metadata field is scored and for updating how different metadata fields and/or field values are weighted. Policy database 295 may also contain policies for implementing Bayesian analysis in classifying communications. Other suitable policies, forms and/or schemes for classifying communications can be stored and applied in policy database 295.

In some embodiments, when adding a new classification scheme or policy, an interface may be provided to modify one or more policies of ingest policy database 295. The interface may require information to be entered regarding how the new scheme should be applied. Such information may be entered using a tabbed interface, a wizard-style interface, or other suitable interfaces for entering information. The information entered may include: the file or communication type or types that should be associated with the new scheme, identifiers associated with the detection nodes that implement the new scheme, jobs to be carried out when implementing the new scheme, and/or other items associated with applying the new scheme. In some embodiments, a policy may be developed that handles files or communications for which the file or communication type is unknown or files or communications for which the file or communication type is not associated with any specific policy. Suitable classification schemes may be applied to such files or communications, such as one or more of classification schemes, signature-based schemes, and behavior-based schemes.

In operation, control system 200 may be able to receive a file or communication and use ingest module 210 to determine what classification scheme should be applied to classify the file or communication. File type module 220 may determine the file or communication type and duplicate module 230 may determine whether or not it has been previously analyzed. If the file or communication has not been previously analyzed, policy module 240 may access a policy in ingest policy database 295. Policy module 240 may use the accessed policy to determine a set of schemes that should be applied to classify the file or communication. Policy module 240 may then enter jobs into jobs database 290 in order to implement the determined classification schemes. Scheduler module 250 may then schedule and monitor the application of the determined schemes to the file. Schedule module 260 may assign the jobs in jobs database 290 to one or more detection nodes.

Monitor module 270 may monitor the load applied to the detection nodes and determine if the load has surpassed a critical value or threshold. In response to passing the threshold, report module 280 may report this occurrence. As a result, the system may switch from operating in an active mode to operating in a passive mode. This may be advantageous, in various embodiments, because the time it takes to complete an analysis of a file or communication may depend on the load present on the detection nodes. For example, if the system is operating in an active mode and files are entering the system at a rate above a particular threshold, messages or other services may be disrupted causing a lower quality of service. By switching into a passive mode, the system may allow the analysis of the file to proceed without lowering the quality of service of services associated with the file being analyzed. For example, certain classification schemes may proceed in real-time (e.g., signature-based or classification-based analysis) while others (e.g., behavior-based analysis) may be delayed. If the classification schemes proceeding in real-time did not cause an alert, then other analyses may be delayed. If the detection schemes proceeding in real-time did cause an alert, then other jobs associated with the file may be given greater priority in the jobs queue. If the load on the detection nodes falls below a critical threshold, report module 280 may report this occurrence. In response, the system may enter into an active mode of operation which may allow, in some embodiments, for greater security since operations associated with the context of the file are delayed while the analysis of the file is proceeding. As another example, in a hybrid mode, certain files or communications may be delayed or removed from the mail stream while other files or communications may not be delayed or removed from the mail stream.

Figure 3:
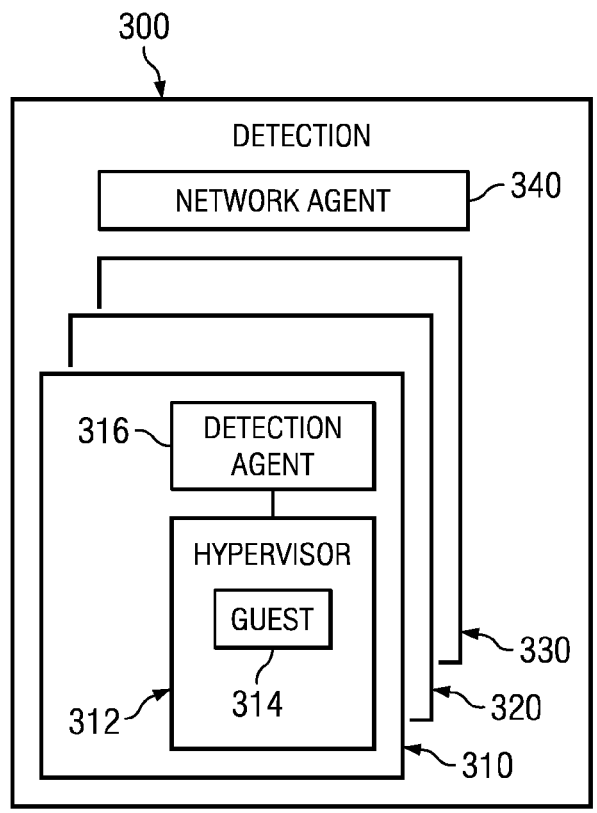
FIG. 3 illustrates one embodiment of a detection subsystem.

FIG. 3 illustrates one embodiment of detection subsystem 300. Detection subsystem 300 includes detection nodes 310, 320, and 330 and network agent 340. Detection node 310 includes hypervisor 312, one or more guest operating systems (GOS) 314, and detection agent 316. Subsystem 300 may be used with, or instead of, control module 200 to classify a communication. For example, control module 200 may receive a file that it determines is a communication that has not been previously analyzed and/or classified. Detection subsystem 300 may then classify the communication based on metadata extracted from the communication and any attachments thereto. The classification may allow the communication to continue on toward the intended recipient if, for example, the communication is classified as not containing malicious code, or it may be forwarded to an alternate destination (e.g., an analyst's inbox) if, for example, the communication is classified as potentially containing malicious code. In certain embodiments, the classification may be a predicted classification. The predicted classification may be subsequently confirmed or denied. This subsequent information may then be used to update how future communications are classified. In certain embodiments, detection subsystem 300 may monitor or track the success of its classifications. Based on this monitoring, it may be possible to provide helpful insights into malicious communications (e.g., it may help identify metadata fields or field values which are better or worse indicators of a particular classification than previously thought).

In some embodiments, detection nodes 310-330 may conform to an interface standard for classifying a communication. Such an interface may include standards for one or more of the following: specifying the file (including, possibly, a URL) that is to be analyzed, configuration parameters for determining if the file is a communication and if so, classifying the communication, time limit for completing the analysis, format of results, specifying the reason for indicating that a metadata field or field value is of interest, providing log files, and other suitable items involved with classifying a communication. In some embodiments, having such an interface may be advantageous because it may allow policies to call for the application of classification schemes without having to give precise parameters based on the configuration of the detection node. In this manner, in various embodiments, new or updated classification schemes may be added to the system without needing to recode various parts of the system since the detection node applying the new detection scheme would conform to the interface standard. For example, to add a new classification scheme, the detection node applying the new classification scheme may be configured to conform to the interface standard by being configured to receive files for analysis in the same or similar manner as other configuration nodes applying other detection or classification schemes. In addition, for example, the configuration node applying the new classification scheme may be configured to report the results of applying the new classification scheme in the same or similar manner as other configuration nodes applying other detection or classification schemes. This, in some embodiments, may be advantageous in that it allows for the system to adapt to new classification schemes.

Detection nodes 310-330 may be implemented on a variety of types of hardware. They may be configured in a blade architecture or on physical hosts. Detection nodes 310-330 may also be configured utilizing clusters or other suitable distributed computing architectures. Detection nodes 310-330 may utilize virtualization or may themselves be virtual machines. Detection nodes 310-330 may be used to apply a variety of classification schemes to a file or communication (which, in some embodiments, may include one or more URLs). In some embodiments, detection nodes 310-330 may be specialized such that each detection node may be configured to apply a type of classification. For example, detection node 310 may be configured to apply Bayesian analysis classification schemes while detection node 320 may be configured to apply frequentist inference analysis classification schemes. As discussed above, detection nodes 310-330 may be configured to apply other forms of classification that conform to an interface to facilitate the incorporation of new or different classification schemes. In various embodiments, subsystem 300 may include a variety of detection nodes in addition to detection nodes 310-330.

Detection agent 316 may be implemented using encoded software. In some embodiments, detection agent 316 may be installed on detection node 310. In various embodiments detection agent 316 may reside on hardware separate from detection node 310 but in communication with detection node 310 and in particular hypervisor 312. Detection agent 316 may be configured to receive jobs that describe classification schemes that should be applied to a file or communication. Detection agent 316 may also be configured to receive the file or communication and send it to hypervisor 312 and cause hypervisor 312 to implement the classification scheme from the job on the file or communication. Detection agent 316 may also be configured to monitor the execution of the classification scheme and report when it is completed. Detection agent 316 may report the results of the application of the classification scheme to the file or communication. In various embodiments, agents such as detection agent 316 may be present in other detection nodes such as nodes 320-330 and cause those nodes to implement a variety of classification schemes.

Hypervisor 312 may allow for communications to be classified in a virtual environment. Hypervisor 312 may, in various embodiments, host multiple guest operating systems (GOS) 314. Hypervisor 312 may, in various embodiments, be able to provide near-instant reversions of GOS 314 during jobs or between jobs. This may be accomplished, for example, by maintaining a state of GOS 314 in memory and tracking changes made to GOS 314 during the execution of the classification schemes. The tracked changes may be stored in memory. When the classification schemes are completed, GOS 314 may be reverted by undoing the changes to GOS 314 during execution of the classification scheme using changes stored in memory. In some embodiments, by applying near-instant reversions and/or applying classification schemes at a configurable observation time, processing of files may be accomplished faster allowing the system to have a higher throughput of analyzed files. Hypervisor 312 may also be able to provide information regarding the execution of the classification schemes without running a process within GOS 314 in various embodiments. Doing so, in some embodiments, may thwart attempts by malicious code to detect if a malicious code detection scheme is being applied to the malicious code.

In various embodiments, GOS 314 may be any of a variety of virtualized operating systems. Examples of such operating systems include various versions of MICROSOFT WINDOWS, APPLE MAC OS, operating systems using the LINUX kernel, operating systems using the BSD kernel, embedded operating systems, mobile operating systems (including those used in mobile telephones or devices), or other computing environments. GOS 314 may include a variety of applications used to access different file types. Such applications may include email clients, word processing applications, image viewing applications, audio applications, video applications, Internet browsing applications, email applications, or other applications.

In some embodiments, a report may be sent based on the monitored behavior and results. An agent associated with the hypervisor may gather the information and send the report. The report may include information such as the name of the file, the type of the file, the versions of applications used to access the file, the versions of the guest operating system used to access the file, the version of the hypervisor used to access the file, the changes to the guest operating system while the file was being accessed, the resources of the virtualized hardware being used while the file was being accessed, and/or other items associated with accessing the file. In certain embodiments a report may be sent identifying newly identified metadata fields or field values. The newly identified metadata fields or field values may be fields or values that were not previously recognized as being indicative of a particular classification. For example, the system may identify that communications sent between particular times are indicative of malicious communications. Upon recognizing this, an indication may be provided in the report identifying the relevant times. This information may be used by human analysts to devise new classification algorithms or to modify existing algorithms to more accurately classify communications.

Network agent 340 may, in various embodiments, be implemented using encoded software, hardware, or a combination of both. Network agent 340 may be configured to provide virtualized networking services to detection nodes 310-330. In some embodiments, these services include simulating a network environment and network nodes in order to facilitate the application of various malicious code detection schemes. For example, detection node 310 may implement a behavior-based classification scheme that includes accessing the file in GOS 314. Part of the classification scheme may include observing how accessing the file impacts a network. Network agent 340 may provide virtual networking services in order to provide the file opportunity to interact with a network. In some embodiments, the network may be simulated.

Figure 4:
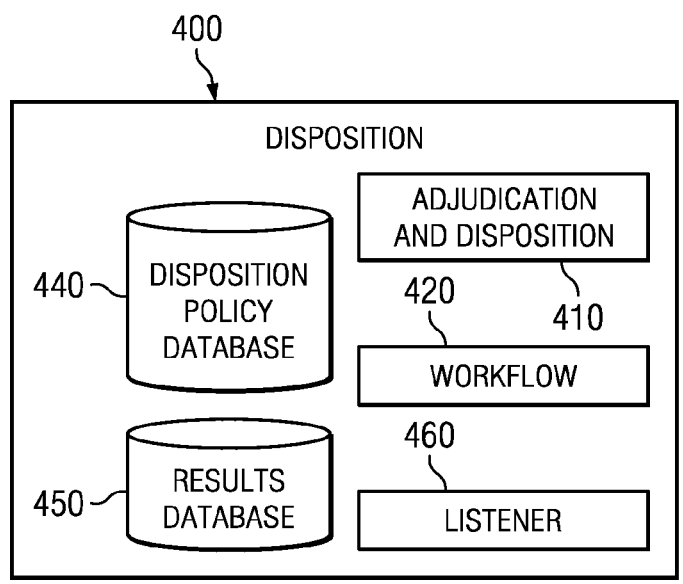
FIG. 4 illustrates one embodiment of a disposition subsystem.

FIG. 4 illustrates one embodiment of disposition subsystem 400. Disposition subsystem 400 includes adjudication and disposition module 410, workflow module 420, policy database 440, and results database 450. Each of modules 410-420 may communicate with one another as well as communicate with results database 450 and policy database 440 in various embodiments. Further details regarding the components of disposition subsystem 400 are given below and in the description of FIG. 5.

Modules 410-420 and 460 may be implemented using encoded software, hardware, or a combination of the two. Each of modules 410-420 and 460 may be implemented on the same hardware or on different hardware. For example, modules 410-420 and 460 may each be on separate pieces of hardware.

Databases 440 and 450 may each be implemented in hardware separate from each other or on the same hardware. Databases 440 and 450 may be implemented on the same or different hardware as modules 410-420. The databases may be row-oriented or column-oriented. They may include relational databases and/or object-oriented databases. Databases 440 and 450 may be indexed and accessed in a variety of manners, including by utilizing an operating system or through one or more networks. In some embodiments, databases 440 and 450 may be implemented in one database such that separate tables within the database may be used to store the information contained in databases 440 and 450.

Adjudication and disposition module 410, in some embodiments, may analyze the outcome of, or provide a final classification for, a communication. For example, after another component of the communication classification system has made an initial classification, adjudication and disposition module 410 may monitor and analyze actions taken by a recipient of the communication (e.g., an analyst). Based on the user's actions adjudication and disposition module 410 may be able to determine a final classification for the communication. The final classification may be used to update the scoring and/or algorithm used to initially classify communications.

In some embodiments, adjudication and disposition module 410 may provide the initial classification of a communication. For example, adjudication and disposition module 410 may access policy database 440 to select one or more adjudication policies in order to determine how a file or communication should be classified. Adjudication policies from policy database 440 may include various ways to determine how to classify a file or communication. Adjudication and disposition module 410 may determine the appropriate adjudication policy to use for the file or communication in question and use the appropriate adjudication policy to score one or more field values and to apply weights to the field values to determine the initial classification. Although weighted scoring is described, particular embodiments may use any other suitable classification mechanism according to particular needs (e.g., clustering).

Adjudication and disposition module 410 may provide entries for results database 450 after determining and/or receiving an initial and/or final classification for a communication. For example, if adjudication and disposition module 410 determines an initial classification of a communication, adjudication and disposition module 410 may create an entry in results database 450. The entry may include any or all of the following items: a name associated with the communication, a subject associated with the communication, a type of communication, a hash value associated with the communication, the individual scores determined for the field values associated with the communication, the result of the weighting algorithm applied to the scores of the communication, the adjudication policy applied to the communication, and the initial or final classification of the communication. Similar entries may be made for any files attached to the communication. The entries in the database may be used to update how adjudication and disposition module 410 (or any other component of the system) scores field values and/or applies an algorithm to the scores for future communications.

In some embodiments, workflow module 420 may determine a workflow for use by a human analyst to classify a communication. A communication may be reviewed by a human analyst after an initial classification is made. In such and other scenarios, workflow module 420 may determine tasks associated with reviewing and classifying the communication. In some embodiments, workflow module 420 may generate a set of tasks to be performed by a human analyst reviewing the classification based on a variety of factors. Such factors may include the type of communication being reviewed and the content of the communication. Other factors may include whether the system is operating in a passive or an active mode.

Workflow module 420 may, in various embodiments, automatically perform certain tasks associated with reviewing the communication by a human analyst to facilitate the review of the file by the human analyst. For example, it may be determined that in order for a file to be properly classified by a human analyst, the communication needs to be opened, read, executed and/or all strings in the communication extracted. Workflow module 420 may automate all, some, or none of this procedure such that it is already performed for the human analyst when they receive the task. Workflow module 420 may also provide a priority associated with the review of the communication. For example, if the communication has already been classified as potentially non-malicious, a lower priority may be assigned to the review of the communication compared to a file that is classified as being potentially malicious. Also, based on the characterization and/or the mode the system is operating in, different workflows may be generated for the communication or the communication may be placed in different queues. In various embodiments, workflow module 420 may be configured to interact with an analysis console (e.g., analysis console 170) to facilitate the creation and operation of the workflows. Policies stored in policy database 440 may also contain information on workflows to be applied to communications based on their characterization before being classified and/or based on the initial classification of the communication. Workflow module 420 may, in some embodiments, access policy database 440 in order to determine the workflow that should be applied to the communication. In various embodiments, workflow module 420 may receive one or more disposition policies that may be used to determine the workflow from adjudication and disposition module 410, as further discussed below.

In some embodiments, adjudication and disposition module 410 may perform operations associated with the context of the communication in response to the characterization of the communication determined by adjudication and disposition module 410. As discussed above, a communication may come from a variety of contexts including a messaging context or a browsing context (this context may include processing URLs). The characterization of the communication may cause certain operations to be performed related to the context of the communication. For example, if the communication came from a messaging context, such as an email, the characterization of the communication may cause certain email handling operations to be performed. For example, it may be determined whether the email should be quarantined or delivered to the intended recipient's inbox based on the classification of the communication. Adjudication and disposition module 410 may provide functionality that allows for these types of operations to be performed.

In various embodiments, when determining actions to perform, adjudication and disposition module 410 may take into account the mode in which the detection system is operating. For example, if the detection system is operating in a passive mode and the communication is classified as potentially containing malicious code, adjudication and disposition module 410 may cause an alert to be sent to an analyst or system administrator that the communication has been characterized as potentially containing malicious code. As another example, if the detection system is operating in an active mode, then an email classified as being malicious may cause the adjudication and disposition module 410 to indicate that the email should not be delivered. In various embodiments, adjudication and disposition module 410 may refer to one or more disposition policies in policy database 440 to determine one or more actions to be taken as a result of the characterization.

In some embodiments, when adding a new detection scheme, an interface may be provided to modify one or more adjudication or disposition policies of policy database 440. The interface may require information to be entered regarding how the classification scheme should be applied. Such information may be entered using a tabbed interface, a wizard-style interface, or other suitable interfaces for entering information. Such information may include: weighted scoring algorithms to apply to responses from detection nodes, workflows that may be generated based on the response of the detection nodes, thresholds or ranges that determine how the communication should be classified based on the response of the detection nodes, actions that should occur based on the classification of the file, and/or other items associated with a detection scheme. In some embodiments, the interface may allow for new actions to be defined that would respond to classifications of the communication. A modular architecture may be utilized where new actions would be able to be "plugged in" to the system so that disposition policies may be easily modified or added.

Listener module 460, in various embodiments, may be implemented using encoded software, hardware or a combination of the two. Listener module 460 may be able to determine when jobs assigned to detection nodes are complete and report the completed status. In some embodiments, the results of listener module 460 may be used by monitor 270 to determine the load of the detection nodes. In some embodiments, listener module 460 may be contacted by a detection node once it has completed classifying a communication and receive the results of the analysis. Listener module 460 may determine when the job has been completed and report the results of completed jobs. In some embodiments, listener module 460 may store the results of the jobs in results database 450. Listener module 460 may increase the priority of jobs in jobs database 290 based on the reported results of completed jobs. For example, if a communication has been scheduled to have five detection schemes applied to the file and one of the detection schemes has reported that there is a high likelihood that the communication is of a particular classification, listener module 460 may decrease the priority of the jobs associated with this communication.

Figure 5:
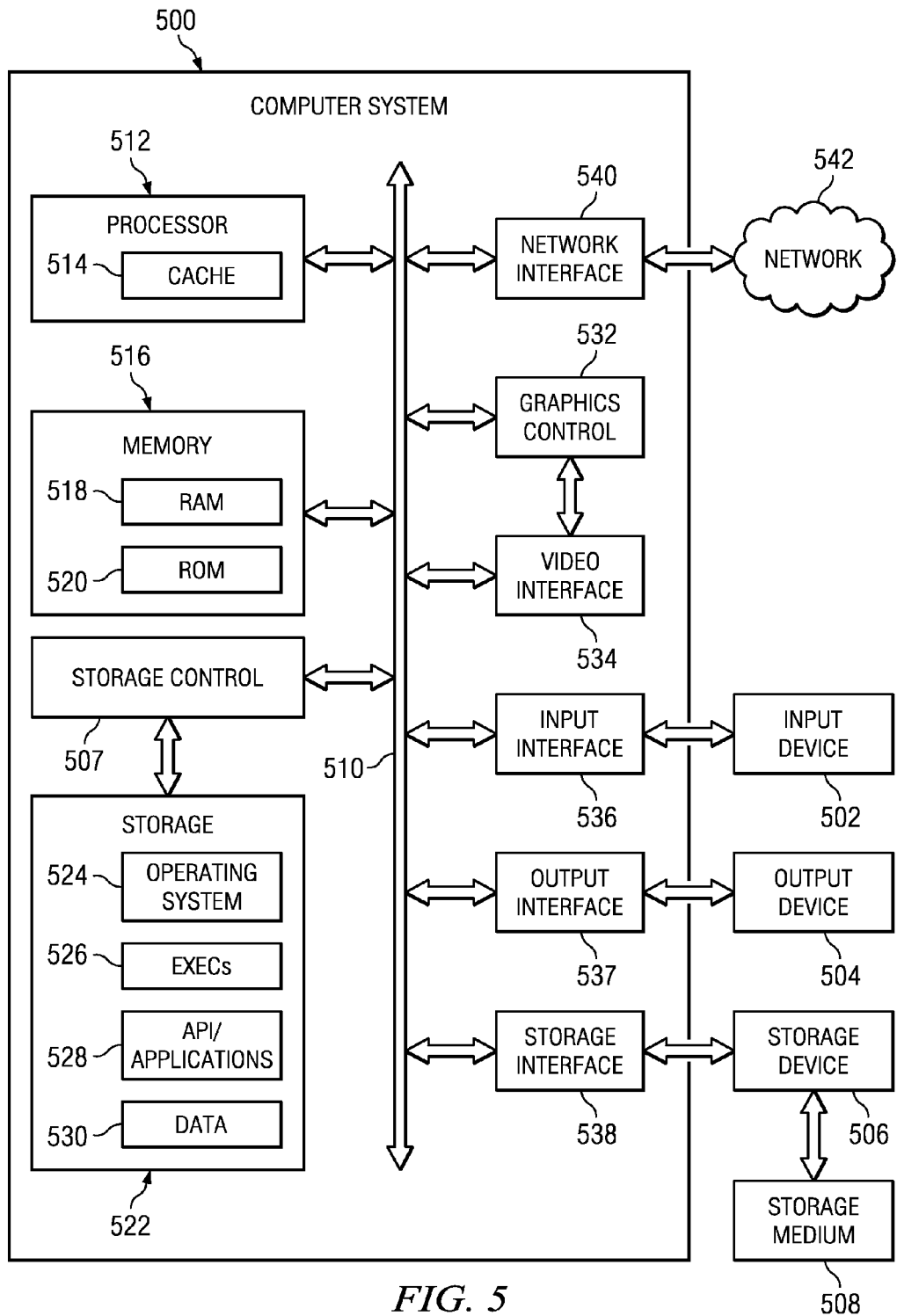
FIG. 5 illustrates an example computer system suitable for implementing one or more portions of particular embodiments.

FIG. 5 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may take any suitable physical form, such as for example one or more integrated circuits (ICs), one or more printed circuit boards (PCBs), one or more handhelds or other devices (such as mobile telephones or PDAs), one or more personal computers, one or more super computers, one or more servers, and one or more distributed computing elements. Blocks 130-180 of FIG. 1 as well as the elements discussed in FIGS. 2-4 may be implemented using all of the components, or any appropriate combination of the components, of computer system 500 described below.

Computer system 500 may have one or more input devices 502 (which may include a keypad, keyboard, mouse, stylus, or other input devices), one or more output devices 504 (which may include one or more displays, one or more speakers, one or more printers, or other output devices), one or more storage devices 506, and one or more storage mediums 508. An input device 502 may be external or internal to computer system 500. An output device 504 may be external or internal to computer system 500. A storage device 506 may be external or internal to computer system 500. A storage medium 508 may be external or internal to computer system 500.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 512 (or central processing units (CPUs)). Processor 512 may contain cache 514 for temporary local storage of instructions, data, or computer addresses. Processor 512 may be coupled to one or more storage devices, including memory 516. Memory 516 may include random access memory (RAM) 518 and read-only memory (ROM) 520. Data and instructions may transfer bidirectionally between processor 512 and RAM 518. Data and instructions may transfer unidirectionally to processor 512 from ROM 520. RAM 518 and ROM 520 may include any suitable computer-readable storage media.

Computer system 500 includes fixed storage 522 coupled bi-directionally to processor 512. Fixed storage 522 may be coupled to processor 512 via storage control unit 507. Fixed storage 522 may provide additional data storage capacity and may include any suitable computer-readable storage media. Fixed storage 522 may store an operating system (OS) 524, one or more executables (EXECs) 526, one or more applications or programs 528, data 530 and the like. Fixed storage 522 is typically a secondary storage medium (such as a hard disk) that is slower than primary storage. In appropriate cases, the information stored by fixed storage 522 may be incorporated as virtual memory into memory 516. In some embodiments, fixed storage 522 may include network resources, such as one or more storage area networks (SAN) or network-attached storage (NAS).

Processor 512 may be coupled to a variety of interfaces, such as, for example, graphics control 532, video interface 534, input interface 536, output interface 537, and storage interface 538, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 540 may couple processor 512 to another computer system or to network 542. Network interface 540 may include wired, wireless, or any combination of wired and wireless components. Such components may include wired network cards, wireless network cards, radios, antennas, cables, or any other appropriate components. With network interface 540, processor 512 may receive or send information from or to network 542 in the course of performing steps of particular embodiments. Particular embodiments may execute solely on processor 512. Particular embodiments may execute on processor 512 and on one or more remote processors operating together.

In a network environment, where computer system 500 is connected to network 542, computer system 500 may communicate with other devices connected to network 542. Computer system 500 may communicate with network 542 via network interface 540. For example, computer system 500 may receive information (such as a request or a response from another device) from network 542 in the form of one or more incoming packets at network interface 540 and memory 516 may store the incoming packets for subsequent processing. Computer system 500 may send information (such as a request or a response to another device) to network 542 in the form of one or more outgoing packets from network interface 540, which memory 516 may store prior to being sent. Processor 512 may access an incoming or outgoing packet in memory 516 to process it, according to particular needs.

Particular embodiments involve one or more computer-storage products that include one or more tangible, non-transitory, computer-readable storage media that embody software for performing one or more steps of one or more processes described or illustrated herein. In particular embodiments, one or more portions of the media, the encoded software, or both may be designed and manufactured specifically to perform one or more steps of one or more processes described or illustrated herein. In addition or as an alternative, in particular embodiments, one or more portions of the media, the encoded software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, encoded software may be machine code which a compiler may generate or one or more files containing higher-level code which a computer may execute using an interpreter.

As an example and not by way of limitation, memory 516 may include one or more tangible, non-transitory, computer-readable storage media embodying software and computer system 500 may provide particular functionality described or illustrated herein as a result of processor 512 executing the encoded software. Memory 516 may store and processor 512 may execute the encoded software. Memory 516 may read the encoded software from the computer-readable storage media in mass storage device 516 embodying the encoded software or from one or more other sources via network interface 540. When executing the encoded software, processor 512 may perform one or more steps of one or more processes described or illustrated herein, which may include defining one or more data structures for storage in memory 516 and modifying one or more of the data structures as directed by one or more portions the encoded software, according to particular needs.

In some embodiments, the described processing and memory elements (such as processor 512 and memory 516) may be distributed across multiple devices such that the operations performed utilizing these elements may also be distributed across multiple devices. For example, encoded software operated utilizing these elements may be run across multiple computers that contain these processing and memory elements. Other variations aside from the stated example are contemplated involving the use of distributed computing.

In addition or as an alternative, computer system 500 may provide particular functionality described or illustrated herein as a result of logic hardwired or otherwise embodied in a circuit, which may operate in place of or together with encoded software to perform one or more steps of one or more processes described or illustrated herein. The present disclosure encompasses any suitable combination of hardware and encoded software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 6:
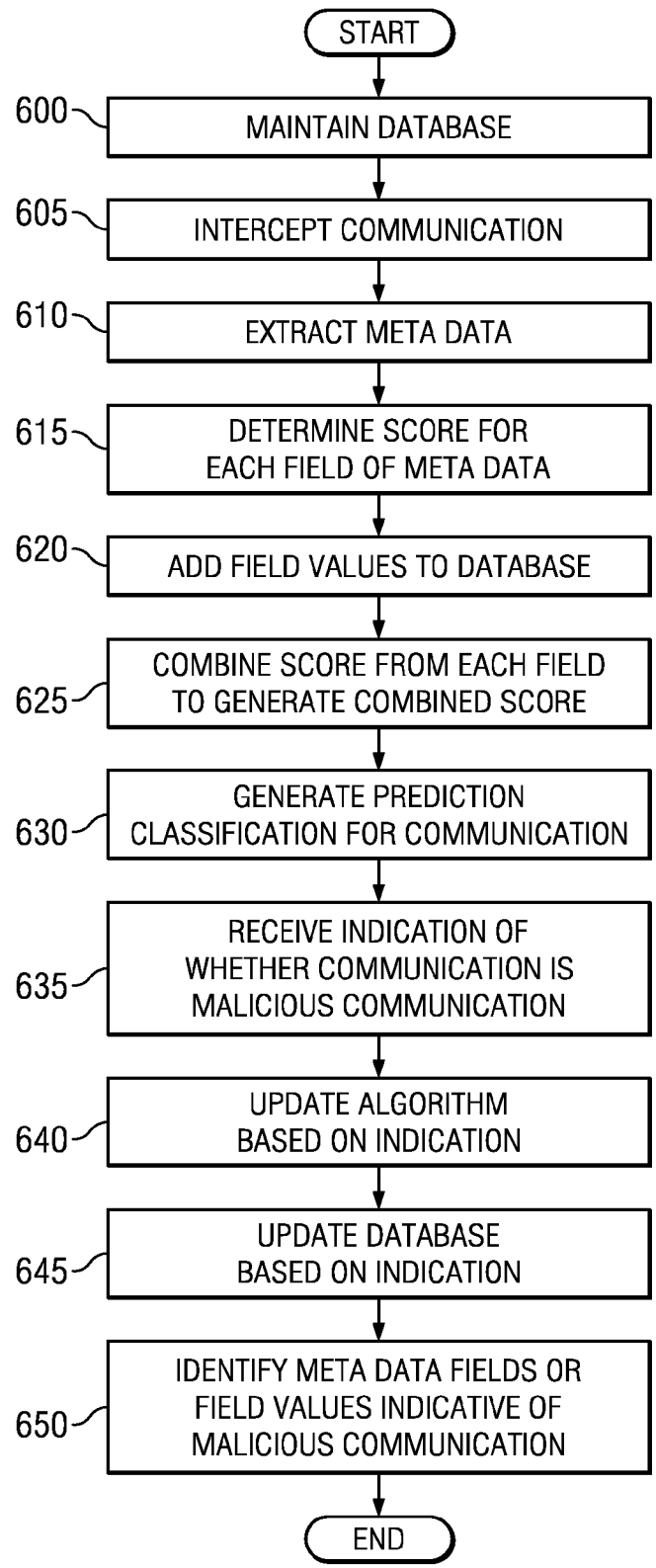
FIG. 6 illustrates a flow chart of a method of one embodiment of classifying communications.

FIG. 6 depicts a flow chart illustrating one embodiment of classifying communications. Depending on the embodiment and/or system configuration, the system performing the steps of the depicted flow chart may be implemented in any of a variety of locations. For example, in some embodiments, the system may be implemented as part of a firewall or provided at a network access point. As another example, the system may be implemented as part of a security system being executed on a user's local computer. As another example, the system may be part of a company's security system. Moreover, the system may be implemented using a variety of techniques. For example, in particular embodiments, the steps depicted below may be implemented using Bayesian analysis. For purposes of this method it may be assumed that the communication to be classified is an email with an attached file, and that the system is configured to classify the communication as a malicious or non-malicious communication.

The method begins at step 600 with the maintaining of a database. The database may contain field values associated with metadata extracted from previous communications intercepted at the first node of the security system. The metadata may be associated with the communication itself (e.g., the communication's header, hidden fields, etc.) or with the attachment (e.g., file version, author, rendering software, time stamp, etc.) of the communication. Each field value may represent the entry or data or value associated with the respective metadata field. The database may also contain an indication as to whether previous communications associated with a particular field value were classified as a particular type of communication. In some embodiments, the indications associated with a field value may be used to derive a score value that may be used to score similar field values received in future intercepted communications. In some embodiments, the database may store the score with the associated field value. In some embodiments, the score may be re-calculated each time a new communication is intercepted. As will be seen in later steps, the database is a dynamic and ever changing database reflecting previous classifications. Depending on the embodiment, the entries of the database may comprise unique entries for each communication, or they may comprise entries summing, tallying, averaging, or otherwise cumulating entries from multiple communications.

At step 605 an incoming communication is intercepted by the security system. The communication may be intercepted at a particular node of the security system configured specifically for intercepting communications. In some embodiments, the communication may be intercepted by a node performing several tasks one of which includes intercepting the communication. In the example depicted in FIG. 6, the communications are intercepted at or before an email server prior to being distributed to the intended recipient.

At step 610 metadata is extracted from the communication. The metadata may comprise a plurality of different fields. In some cases, each field may have a different field value. For example, one metadata field may be a sender field. The field value may be an email address associated with the sender of the email. In some embodiments, extracting the metadata comprises extracting a subset of fields of the plurality of different fields of metadata associated with the communication. The subset of metadata fields may be based on fields of metadata most relevant to generating a predicted classification as to whether the communication is or is not a malicious communication. The relevancy of particular fields may vary over time, and may be dependent on previous communications.

At step 615 a score is determined for each field of metadata. The score may be based on a likelihood of the field value being an indication that the intercepted communication is a particular type of communication. The score for each field of the extracted metadata may be determined based on previous communications. In particular, the score may be based on how previous communications, having the same field value, were classified. As an example, in a situation where a security system has received several malicious communications sent from a particular domain, the system may decide that other communications received from the same domain are likely to be malicious as well. Thus, a sender domain field value from an intercepted communication sent from that particular domain may be given a score indicative of the communication being malicious. The score for each metadata field may be a binary score. That is, the score may indicate simply a yes or no as to whether or not the particular field value is likely to be indicative of a particular classification. Because a communication has multiple metadata fields, no one score will be determinative of the predicted classification. In some embodiments, determining the score may simply be a matter of retrieving a score value stored in the database maintained at step 600. In certain embodiments, the score may be determined by calculating a score value based on several data points. For example, the database may, for each communication received from a particular domain or sender, store an indication as to whether the communication was classified as malicious or not. Then, when a new communication from that particular domain or sender is received, the system may apply the indications from the previous communications to an algorithm to determine a score value. The score value may then be used to determine the score for the intercepted communication. In some embodiments, the data in the database used to determine the scoring may have been received, updated, maintained, or supplied by a second or different node within the security system.

At step 620 the field values may be added to the database. The added field values may be based on the extracted metadata. The field values may be added in a temporary state. Then, once the intercepted communication has been classified, the field values are updated accordingly.

At step 625 the scores from each of the metadata fields are combined to generate a combined score. The combination of scores may be based on an algorithm that evolves over time based on how previous communications are classified. For example, in some embodiments the algorithm may, in essence, apply varying weights to different metadata fields or field values. As more communications are intercepted and processed, the system may update or modify how different metadata fields or field values are weighted.

At step 630 a predicted classification for the communication is generated. The predicted classification may be a prediction as to whether the communication is a particular type of communication. The predicted classification may be based on the combined score determined at step 625. For example, in some embodiments, if the combined score is greater than or equal to a threshold value then the predicted classification may be that the communication is malicious. The predicted classification may be an initial, temporary classification until step 635 in which an indication of the actual classification is received. The predicted classification may be used to process the classification until such time as a classification is determined by another component of the security system, or a user or recipient of the intercepted communication.

At step 635 an indication is received as to whether the communication is a malicious communication. Depending on the scenario, the indication may be explicit or it may be implicit. The indication may either confirm or correct the predicted classification generated at step 630. For example, assume the predicted classification was that the communication is a potentially malicious communication. Based on the predicted classification, the communication may be sent to a human analyst or another component or device of the system for classification. The analyst (human or otherwise) of the communication may then, upon examining the communication, decide that the communication is not malicious and may release the communication to the intended recipient's inbox. The security system may receive an indication that the intercepted communication has been released to the intended recipient's inbox. Based on this, the security system may determine that the predicted classification was incorrect and may update the database and/or algorithm based on the classification indication. Updating the algorithm and the database is done at steps 640 and 645, respectively. As another example, if the security system had classified an intercepted communication as potentially malicious and then the analyst deletes the communication (or the malicious portion thereof), the security system may receive an indication that the malicious communication was destroyed and may conclude that the prediction was accurate. The security system may then update the algorithm and the database based on this indication.

At steps 640 and 645, the algorithm and database are updated based on the classification indication. How the update is performed may depend on how the database or algorithm is maintained. For example, if the database lists the classification of each communication for each metadata field, then updating the database may simply comprise adding the classification for the intercepted communication to each metadata field or field value. In some instances, only the most recent classifications may be maintained in the database. In such an instance, once the desired number of classifications have been added, each subsequent classification added may cause another classification (e.g., an older classification) to be removed. As another example, if the database lists a score for each metadata field or field value, then updating the database may comprise recalculating the score for each relevant metadata field or field value based on the classification indication.

At step 650 metadata fields or field values indicative of a malicious communication are identified. The identified fields or field values may be fields or field values not previously recognized as being indicative of malicious communications. In certain embodiments, the metadata fields or field values may be identified by periodic analysis of the database maintained at step 600. The identification of the metadata fields or field values may be provided in a report to a user, or may be kept internally as part of an update to the algorithm or database used by the security system to classify future communications. In some embodiments, the identified metadata fields or field values may be ones that typical computer, machine, or human analysts would not easily be able to discern as being relevant to the classification of a communication.

In general, the steps illustrated in FIG. 6 may be repeated for any intercepted communication. In addition, in general, the steps illustrated in FIG. 6 may be combined, modified, or deleted where appropriate, and additional steps may also be added to the example operation. Furthermore, the described steps may be performed in any suitable order and/or in parallel where appropriate. In some embodiments, the steps described above may be performed by any suitable combination of the elements discussed above with respect to FIGS. 1-5. While it was assumed for purposes of explanation that the intercepted communication was an email, the steps described above may be performed for any intercepted communication, website, or file. Moreover, while it was assumed that the intercepted communication was being classified as malicious or non-malicious, the steps above may be performed for any type of classification.

The embodiments that this disclosure (including all attachments hereto) describes or illustrates are examples, and they do not limit the scope of this disclosure. This disclosure encompasses all changes, substitutions, variations, alterations, and modifications to the example embodiments herein that a person having ordinary skill in the art would comprehend. Modifications, additions, or omissions may be made to the systems and apparatuses disclosed herein without departing from the scope of this disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising tangibly stored software, hardware, and/or other encoded logic. As used in this document, "each" refers to each member of a set or each member of a subset of a set. Modifications, additions, or omissions may be made to the methods disclosed herein without departing from the scope of this disclosure. The method may include more, fewer, or other steps. Additionally, steps may be performed in any suitable order.

Logic may perform the operations of one or more components, for example, executes instructions to generate output from input. Logic may include hardware, encoded software, and/or other logic. Logic may be encoded in one or more tangible non-transitory computer readable media and may perform operations when executed by a computer. Certain logic, such as a processor, may manage the operation of a component. Examples of a processor include one or more computers, one or more microprocessors, one or more applications, and/or other logic. In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A computer-implemented method for execution by one or more processors, the method comprising:
   intercepting a communication of a first type at a first node of a security system;
   extracting communication metadata from the communication, the communication metadata comprising a plurality of different fields, the plurality of different fields including first header fields from the communication, each of the first header fields including characters that describe a property of the communication;
   determining if the communication comprises an attached file;
   upon determining the communication comprises an attached file, extracting file metadata from the file, the file metadata comprising a second plurality of different fields, the second plurality of different fields including second header fields of the file different from the first header fields, each of the second header fields including characters that describe a property of the file;
   determining a score for each field of extracted metadata comprising the file metadata and the communication metadata, the score for each field of the extracted metadata indicative of a likelihood that the communication is a malicious communication, the score for each field of the extracted metadata determined based on previous communications;
   combining the scores for the plurality of fields of the extracted metadata to generate a combined score for the communication, the combined score based on an algorithm developed from the previous communications, the algorithm including assigning varying weights to one or more of the plurality of fields;
   generating, at a first time based on the combined score, a predicted classification providing a prediction as to whether the communication is a malicious communication;
   receiving, at a second time subsequent to the first time, an indication of whether the communication is a malicious communication; and
   updating the algorithm based on the indication of whether the communication is a malicious communication.

2. The method of claim 1, wherein determining the score for each field of the extracted metadata comprises:
   maintaining a database comprising:
      field values associated with previously extracted metadata from the previous communications intercepted at the first node of the security system; and
      an indication of whether the previous communications associated with particular field values were malicious communications;
   adding to the database a plurality of field values for the plurality of different fields from the extracted metadata associated with the communication; and
   updating the database based on the indication of whether the communication is a malicious communication.

3. The method of claim 1, wherein extracting communication metadata comprises extracting a sub-set of fields of the plurality of different fields of the communication metadata associated with the communication, the sub-set of fields based on fields of communication metadata most relevant to generating at the first time the predicted classification as to whether the communication is a malicious communication.

4. The method of claim 1, further comprising identifying one or more extracted metadata fields and field values that are indicative of a malicious communication, the identified metadata fields and field values not previously recognized as being indicative of the first type of communication.

5. The method of claim 1, wherein generating the predicted classification comprises applying Bayesian analysis to generate a predicted classification as to whether the communication is a malicious communication.

6. The method of claim 1, wherein the malicious communication is an unsolicited communication comprising malware.

7. The method of claim 1, wherein the malicious communication is a communication comprising malicious code.

8. The method of claim 1, wherein determining the score for each field of the extracted metadata comprises determining the score for each field of the extracted metadata based on data provided by at least a second node of the security system.

9. A system for classifying a communication, comprising:
   an interface configured to intercept a communication of a first type at a first node of a security system;
   a processor coupled to the interface and configured to:
      extract communication metadata from the communication, the communication metadata comprising a plurality of different fields, the plurality of different fields including first header fields, each of the first header fields including characters that describe a property of the communication;
      determine if the communication comprises an attached file;
      upon determining the communication comprises an attached file, extract file metadata from the file, the file metadata comprising a second plurality of different fields, the second plurality of different fields including second header fields, different from the first header fields, each of the second header fields including characters that describe a property of the file;
      determine a score for each field of extracted metadata comprising the file metadata and the communication meta data, the score for each field of the extracted metadata indicative of a likelihood that the communication is a malicious communication, the score for each field of the extracted metadata determined based on previous communications;
      combine the scores for the plurality of fields of the extracted metadata to generate a combined score for the communication, the combined score based on an algorithm developed from the previous communications, the algorithm including assigning varying weights to one or more of the plurality of fields; and
      generate, at a first time based on the combined score, a predicted classification providing a prediction as to whether the communication is a malicious communication;
   wherein the interface is further configured to receive, at a second time subsequent to the first time, an indication of whether the communication is a malicious communication; and
   the processor is further configured to update the algorithm based on the indication of whether the communication is a malicious communication.

10. The system of claim 9, wherein the processor configured to determine the score for each field of the extracted metadata is further configured to:
   maintain a database comprising:
      field values associated with previously extracted metadata from the previous communications intercepted at the first node of the security system; and an indication of whether the previous communications associated with particular field values were malicious communications;

add to the database a plurality of field values for the plurality of different fields from the extracted metadata associated with the communication; and update the database based on the indication of whether the communication is a malicious communication.

11. The system of claim 9, wherein the processor configured to extract communication metadata is further configured to extract a sub-set of fields of the plurality of different fields of the communication metadata associated with the communication, the sub-set of fields based on fields of communication metadata most relevant to generating at the first time the predicted classification as to whether the communication is a malicious communication.

12. The system of claim 9, wherein the processor is further configured to identify one or more extracted metadata fields and field values that are indicative of a malicious communication, the identified metadata fields and field values not previously recognized as being indicative of a malicious communication.

13. The system of claim 9, wherein the processor configured to generate a predicted classification is further configured to apply Bayesian analysis to generate a predicted classification as to whether the communication is a malicious communication.

14. The system of claim 9, wherein the malicious communication is an unsolicited communication comprising malware.

15. The system of claim 9, wherein the malicious communication is a communication comprising malicious code.

16. The system of claim 9, wherein the processor configured to determine a score for each field of the extracted metadata is further configured to determine the score for each field of the extracted metadata based on data provided by at least a second node of the security system.

17. Non-transitory computer-readable storage media comprising instructions that when executed by a processor are operable to:

intercept a communication of a first type at a first node of a security system;

extract communication metadata from the communication, the metadata comprising a plurality of different fields, the plurality of different fields including first header fields, each of the first header fields including characters that describe a property of the communication;

determine if the communication comprises an attached file;

upon determining the communication comprises an attached file, extract file metadata from the file, the file metadata comprising a second plurality of different fields, the second plurality of different fields including second header fields, different from the first header fields, each of the second header fields including characters that describe a property of the file;

determine a score for each field of extracted metadata comprising the file metadata and the communication metadata, the score for each field of the extracted metadata indicative of a likelihood that the communication is a malicious communication, the score for each field of the extracted metadata determined based on previous communications;

combine the scores for the plurality of fields of the extracted metadata to generate a combined score for the communication, the combined score based on an algorithm developed from the previous communications, the algorithm including assigning varying weights to one or more of the plurality of fields;

generate, at a first time based on the combined score, a predicted classification providing a prediction as to whether the communication is a malicious communication;

receive, at a second time subsequent to the first time, an indication of whether the communication is a malicious communication; and update the algorithm based on the indication of whether the communication is a malicious communication.

18. The media of claim 17, wherein the instructions operable to determine the score for each field of the extracted metadata are further operable to:

maintain a database comprising:
field values associated with previously extracted metadata from the previous communications intercepted at the first node of the security system; and
an indication of whether the previous communications associated with particular field values were malicious communications;

add to the database a plurality of field values for the plurality of different fields from the extracted metadata associated with the communication; and update the database based on the indication of whether the communication is a malicious communication.

19. The media of claim 17, wherein the instructions operable to extract communication metadata are further operable to extract a sub-set of fields of the plurality of different fields of the communication metadata associated with the communication, the sub-set of fields based on fields of communication metadata most relevant to generating at the first time the predicted classification as to whether the communication is a malicious communication.

20. The media of claim 17, wherein the instructions are further operable to identify one or more extracted metadata fields and field values that are indicative of the malicious communication, the identified metadata fields and field values not previously recognized as being indicative of the malicious communication.

21. The media of claim 17, wherein the instructions operable to generate a predicted classification are further operable to apply Bayesian analysis to generate a predicted classification as to whether the communication is a malicious communication.

22. The media of claim 17, wherein the malicious communication is a communication comprising malware.

23. The media of claim 17, wherein the malicious communication is a communication comprising malicious code.

24. The media of claim 17, wherein the instructions operable to determine a score for each field of the extracted metadata are further operable to determine the score for each field of the extracted metadata based on data provided by at least a second node of the security system.

* * * * *

UNITED STATES PATENT AND TRADEMARK OFFICE
CERTIFICATE OF CORRECTION

PATENT NO. : 8,875,293 B2
APPLICATION NO. : 13/240567
DATED : October 28, 2014
INVENTOR(S) : McDougal et al.

Page 1 of 1

It is certified that error appears in the above-identified patent and that said Letters Patent is hereby corrected as shown below:

In the specification

In column 16, line 23, after "monitor", insert --module--, therefor

In the claims

In column 23, line 18, in Claim 1, delete "file" and insert --file,--, therefor

Signed and Sealed this
Fifth Day of April, 2016

Michelle K. Lee
*Director of the United States Patent and Trademark Office*